Figure 1:
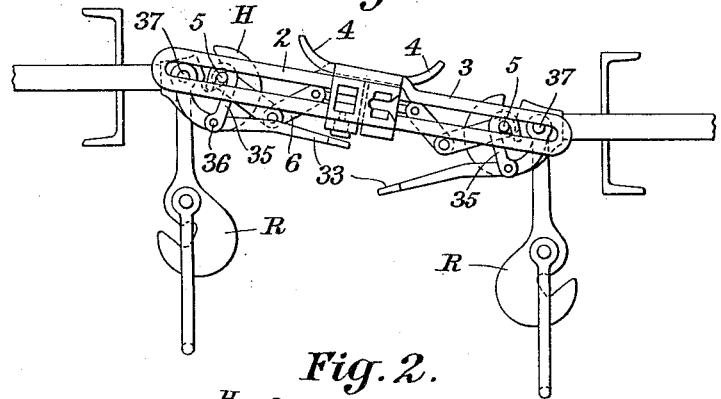

W. v. SOKOLOWSKI.
AUTOMATIC COUPLING FOR RAILWAY CARS.
APPLICATION FILED JAN. 6, 1913.

1,104,713.

Patented July 21, 1914.

4 SHEETS—SHEET 1.

W. v. SOKOLOWSKI.
AUTOMATIC COUPLING FOR RAILWAY CARS.
APPLICATION FILED JAN. 6, 1913.
1,104,713.
Patented July 21, 1914.
4 SHEETS—SHEET 2.
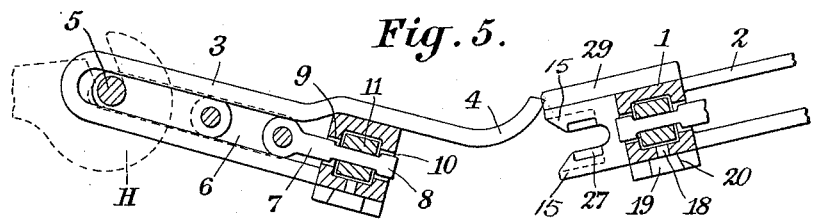
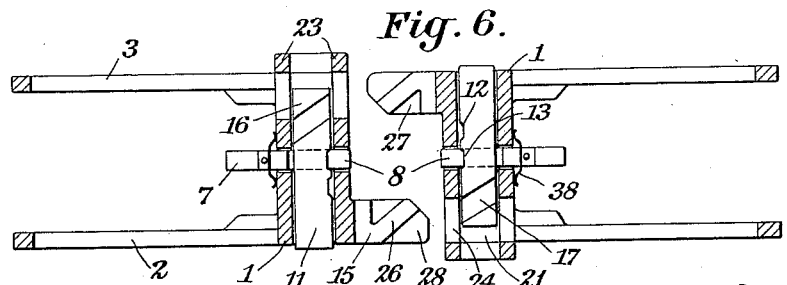
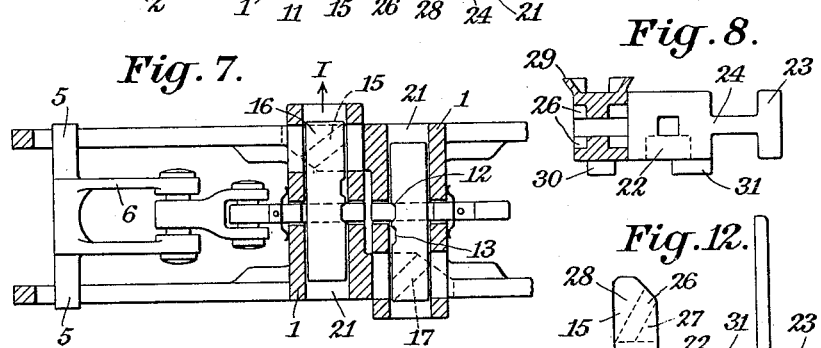
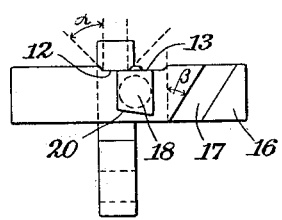
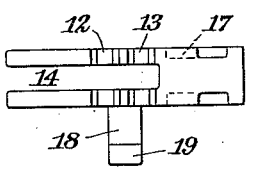
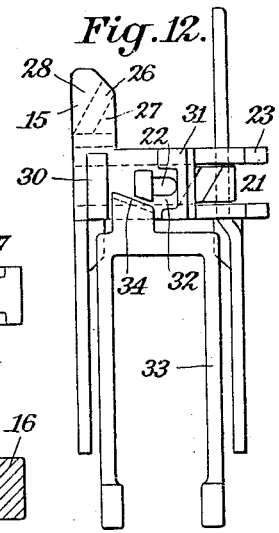
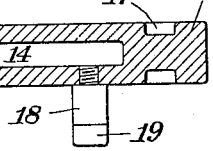

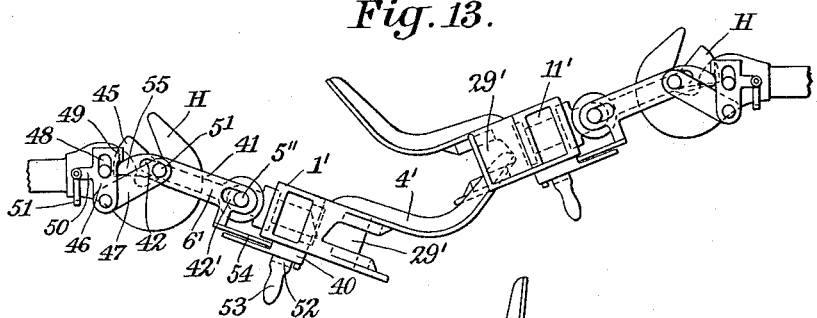
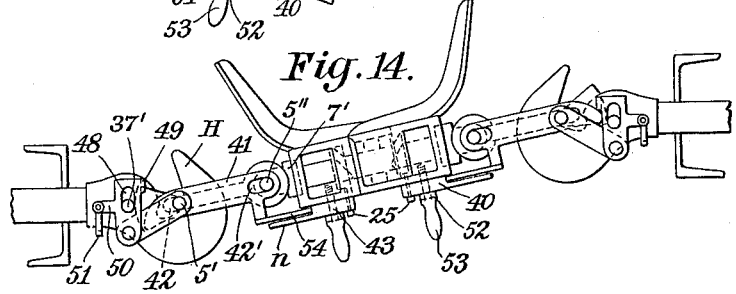
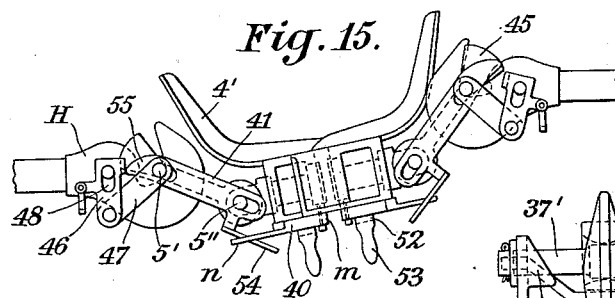
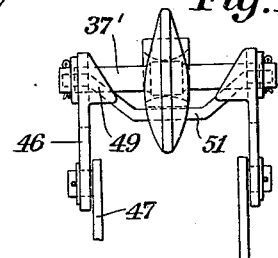
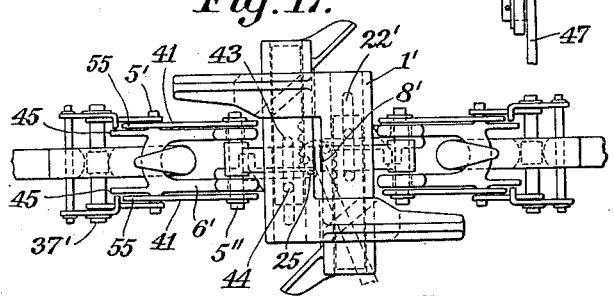

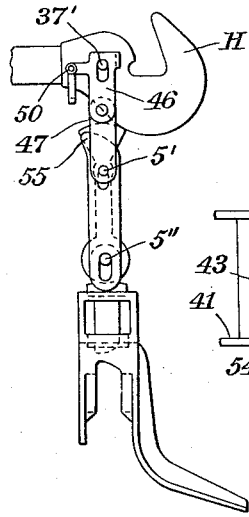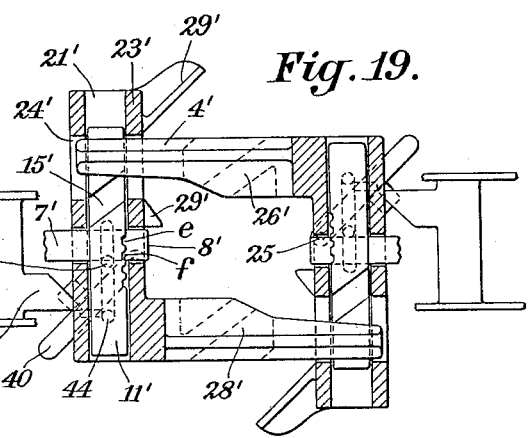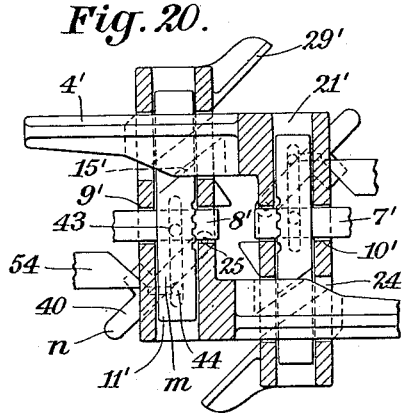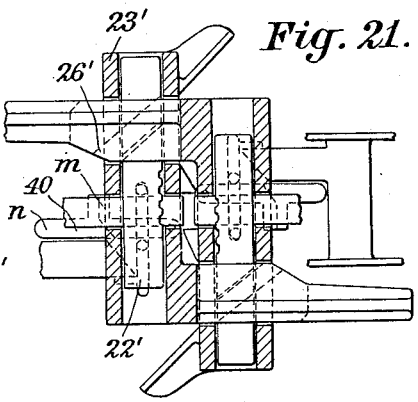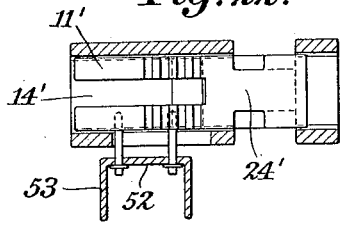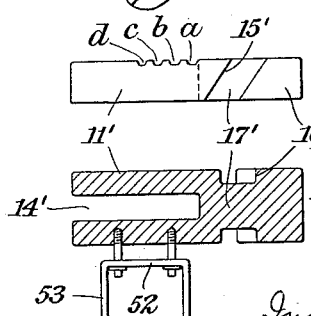

UNITED STATES PATENT OFFICE.

WITOLD v. SOKOLOWSKI, OF WARSAW, RUSSIA, ASSIGNOR OF ONE-HALF TO WITOLD MORZYCKI, OF ST. PETERSBURG, RUSSIA.

AUTOMATIC COUPLING FOR RAILWAY-CARS.

1,104,713. Specification of Letters Patent. Patented July 21, 1914.

Application filed January 6, 1913. Serial No. 740,436.

*To all whom it may concern:*

Be it known that I, WITOLD V. SOKOLOWSKI, a subject of the Czar of Russia, and residing at Warsaw, Russia, have invented certain new and useful Improvements in Automatic Couplings for Railway-Cars, of which the following is a specification.

My invention relates to automatic couplings for railway cars.

In order to be able automatically to couple railway cars couplings have heretofore been constructed based on the principle that when the cars approach one another, coupling members are shifted by suitable faces whose return movement is prevented by suitable locking devices, so that the two cars are thereby rigidly coupled together. All known locking devices, however, which are the most important parts of couplings constructed on the mentioned principle, have attached to them disadvantages owing to the action of the same not being sufficiently certain, as they are not equal to the requirements of working which are exceedingly severe. This is due, on the one hand, to the locking members being under the influence of only one component of the tensile force which occurs, so that they can be readily released by too small a force, and, on the other hand, the distribution of the forces is so unfavorable and the construction of the locking members can readily break when at work.

A primary object of my invention is to provide an improved automatic coupling to which these disadvantages are not attached. To this end, I arrange that the two halves of the coupling are locked together by chains which are attached to the draw hooks being automatically fixed, said chains being for this purpose automatically compelled to form with the halves of the coupling a rigid connection during the coupling operation. As the locking takes place by means of the chains attached to the draw hooks, the entire tensile force is available for the locking, and, in addition, provision is made that the tensile force acts as favorably as possible in every respect, the construction of the coupling being exceedingly simple. The coupling and locking of the two halves of the coupling effected under these favorable conditions enables the coupling to be undone by hand without exerting much force and without special auxiliary means.

Two illustrative embodiments of my invention are represented by way of example in the accompanying drawings, wherein:—

Figure 2:
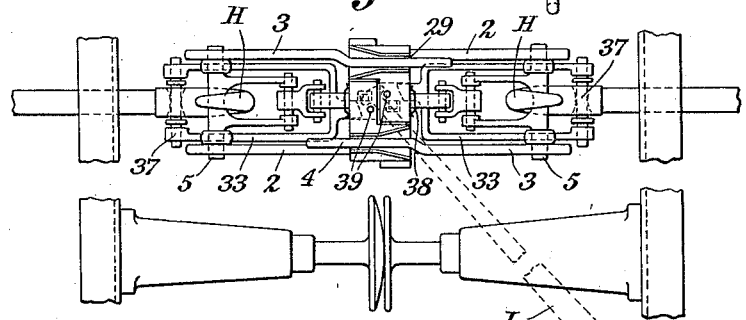
Figure 3:
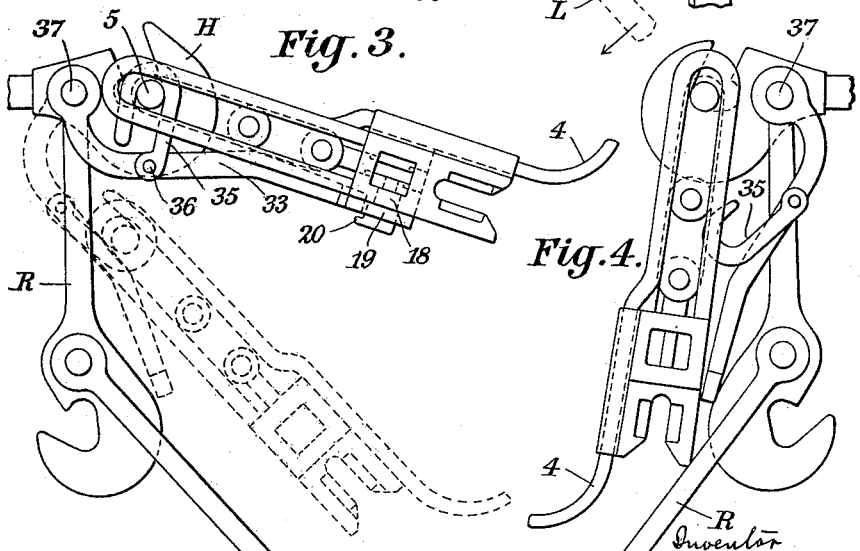
Figure 4:
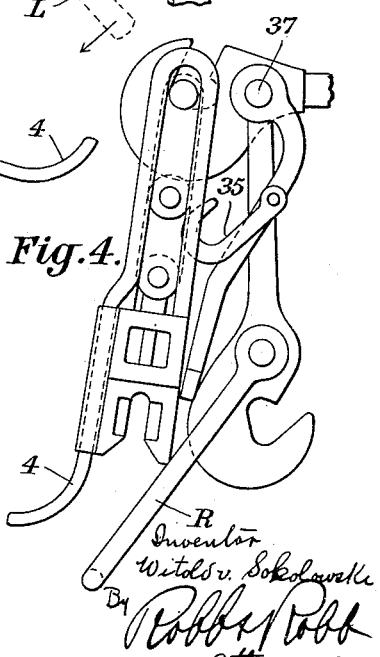

Figure 1 is a side elevation showing the coupling in its engaged position, and Fig. 2 is a top plan view thereof; Fig. 3 is an elevation showing one half of the coupling suspended from a draw hook, and Fig. 4 is a like view of the other half of the coupling pressed downward; Figs. 5 and 6 are side elevation, partly in section, and horizontal section, respectively, showing the two halves of the coupling before their engagement, and Fig. 7 is a horizontal section showing the halves of the coupling engaged; Fig. 8 is a section through part of one half of the coupling; Fig. 9 is a bottom plan view showing the transverse sliding bolt and the inner link of the chain, Fig. 10 is an elevation showing the transverse sliding bolt, and Fig. 11 is a vertical longitudinal section through the latter; Fig. 12 is a bottom plan view showing the frame and the intermediate rods; Fig. 13 is a side elevation showing a modified form of the two halves of the coupling before their engagement, Fig. 14 is a like view thereof after they have been locked the first time, and Fig. 15 is a like view of the same after they have been locked the second time; Fig. 16 is an end elevation showing a draw hook and the parts attached thereto; Fig. 17 is a top plan view showing the two halves of the coupling; Fig. 18 is a side elevation showing one half of the coupling out of operation; Fig. 19 is a plan view, partly in horizontal section, showing the two halves of the coupling before being uncoupled; Fig. 20 is a horizontal section through the two halves of the coupling in the position corresponding to the first locking operation, and Fig. 21 is a like view after the coupling has been locked a second time; Fig. 22 is a cross-section through the coupling head showing the transverse bolt in elevation, and Figs. 23 and 24 are side elevation, and longitudinal section, respectively, showing the sliding bolt.

Referring firstly to Figs. 1 to 12, the coupling frame provided on each end of the car comprises a rectangular coupling head 1 having two slotted arms 2, 3 (Figs. 2 and 6). The coupling frame is movably connected by means of these arms with a chain 6 which may consist of two or three links; the pivot pin 5 at one end of the chain slides in the slots in the arms 2, 3 and passes through the draw hook H. The other end of the chain 6 has the square link 7 which is provided with the projection 8 and is guided in suitable openings 9, 10 in the coupling head 1. The link 7 also passes through the slot 14 of a transverse sliding bolt 11 (Figs. 5 and 11) which moves transversely of the direction of the tensile force in a square hole 21 in the coupling head 1. This transverse slide 11 is provided with one recess 12 and one recess 13 which coact with the projection 8 of the link 7, this projection being held by the influence of a small spring 38, on which the tensile force has no influence, in the one or the other recess. The one end of the bolt or slide 11 is provided with slanting rectangular key ways 17 (Figs. 6, 7, 9, 10 and 11). In addition, the transverse bolt has screwed to it a pin 18 provided with a head 19 and a beveled face 20 which coact with the hereinafter described intermediate rod 33. The pin 18 moves in an oval hole 22 in the coupling head 1. At both sides of the hole 22 on the head 1 are two projections or stops 30 and 31 (Figs. 8 and 12), of which the projection 31 has a recess 32 for receiving the head 19 of the pin 18 (Figs. 3, 5, 6, 7, 8 and 12). The head 1 is also provided with the projection or stop 23 and the necks 24 which are so broad that the lugs 15 provided on the head 1 can enter into them when the coupling is being coupled. The lugs 15 are provided with slanting ribs 26 by which the wedge-shaped faces 27 are formed inside and the sliding faces 28 outside. The ribs 26 work in the grooves 17, and the sliding faces 28 coact with the faces 16 of the transverse slide 11. A bow-shaped intermediate rod 33 provided with a slanting or beveled projection 34 is pivoted by means of a pin 37 in the usual hole provided in every draw hook; when not in use this rod 33 is held in a downwardly slanting position by the hooks 35 which are fulcrumed at 36 and engage over the pivot 5 of the chain.

In order to enable the coupling to be released both on a straight section and also on a curve and at various elevations of the cars, the two halves of the coupling are lifted in the plane of engagement by means known in themselves, for example curved horns 4 which coact crosswise with guides 29 provided on the lugs 15. When lifting upward, the intermediate rod 33 is lifted by the head 19 of the pin 18 and thereby establishes a rigid connection between the frame of the coupling and the chain. Consequently, the lugs 15 of the one frame enter into the neck 24 of the other, and the ribs 26 into the groove 17 of the transverse bolt 11. After the very slight pressure of the spring 38 has been overcome, the transverse bolt 11 is thereby shifted so far in the hole 21 that the recess 12 arrives opposite the projection 8 of the link 7 and the projection 8 snaps under the influence of the spring 38 into this recess. During this time the head 19 of the pin 18 moves out of reach of the projection 34 into the recess 32, whereby the intermediate rod 33 is released and now falls back into its initial position, so that the rigid connection between the chain and the frame of the coupling is done away with. If the cars thus coupled are now drawn to one side, by a locomotive for example, the entire tensile force is taken up by the chain, the bolt 11 and the wedge-shaped faces 17, 26. That component of the tensile force which acts in the direction of the arrow I (Fig. 7) is taken up by the projection 23 of the head 1. The oppositely directed component tends to shift the bolt 11 into its unlocking position. This force, however, is opposed by the entire tensile force of the chain which acts at right angles on the bolt, so that in this manner a completely rigid and certain coupling is obtained, particularly as the tensile force acts centrically. In order to detach this coupling, i. e. to unlock the bolt 11, it is sufficient to push apart the two coupling frames a distance equal to the depth of the recess 13 in the bolt 11. As will be readily understood, the force requisite for this is dependent on the angle of inclination of the recess and on the angle of inclination of the groove 17 in the bolt 11, and when properly designed the angle may be so small that the coupling can be readily opened even when the chains are pulled taut. In practice, for example, the coupling can be opened from outside the cars by hand by means of a lever L which abuts against the pivot 39 mounted in the head 1. Owing to the two coupling frames being pushed apart the bolt 11 is released and the frames return into the position shown in Fig. 6. After being released and as long as the frames do not fall into their initial positions, uncoupling is impossible, because the rigid connection of the frames with the chain with the aid of the intermediate rod 33 is necessary therefor. This has the advantage that when shunting the one car can be set moving by jerks.

In order completely to negative the action of the automatic coupling it suffices to remove the halves of the coupling out of the hooks and to suspend them from the hook 35 of the intermediate rod 33 according to Fig. 3, so that the cars can now be coupled by the ordinary, non-automatic coupling members R.

In the above-described illustrative embodiment, a special intermediate rod 33 is necessary for enabling the two halves of the coupling to be coupled. In the illustrative embodiment shown in Figs. 13 to 24, no such rod is used for this purpose. In this simplified embodiment, however, it is simultaneously possible to obtain a double lock which could not be obtained in the embodiment described with reference to Figs. 1 to 12.

Referring now to Figs. 13 to 24, instead of the above-described intermediate rod and the arms 2, 3 connected with the coupling head, two slide rods 41 having slots 42 and 42' are arranged on the pins 5', 5'' of the chain 6' consisting in this case of only two links (Figs. 13–17). The slide rods 41 terminate at one common tongue 54 and are provided with projections 55 at the other end. A rocking plate 40 is mounted to rock about a bolt 25 mounted on the bottom of the head 1', which plate comprises a thick portion $m$ and a thin portion $n$ (Figs. 15, 20.) Two bolts 43, 44, rigidly connected with the transverse bolt 11', move in an oval hole 22' in the head 1'. A connecting member 52 having a downwardly bent end 53 is attached to the bolts 43, 44. (Figs. 14, 17, 24.) The transverse slide or bolt 11', which is otherwise like that described above and can move in the head 1' transversely of the direction of the tensile force, here possesses four similar recesses $a, b, c, d$ (Figs. 22, 23). The projection 8' of the inner link 7' of the chain has two projections $e, f$, (Fig. 19) corresponding to the recesses $a, b, c, d$ of the transverse slide. The coupling heads 1' run out into bent guide rods 4' guided at the inlet faces 29' (Fig. 19).

The outer link of the chain 6' is provided with two flat projections 45 which can bear against the pins 37' provided in the hole in the hook of the car (Figs. 14, 17). Suspended from this pin 37' at the two sides of the hook are two chains each consisting of two links 46, 47, of which the link 47 is pivoted to the pin 5' of the outer link of the chain 6'. The links 46 are provided with oval slots 48, which coact with the pin 37', and with projections 49 (Figs. 13, 15, 16) and possess lever arms 50, to which is pivoted the one link 51 embracing the hook H (Fig. 16).

When the two halves of the coupling approach one another the guide rods 4' arrive between the inlet faces 29' and slide on the top of the head 1' and the transverse bolt 11' (Figs. 13, 19). The bolt 44 attached to the bottom of the transverse bolt 11' moves under the influence of the latter out of the position shown in Fig. 19 into that according to Fig. 20. Simultaneously, the projections $e, f$ of the lug 8' of the link 7' leave the recesses $a, b$ of the transverse slide and snap into the recesses $b, c$ of the same (Figs. 19, 20, 23). Similarly as in the above described embodiment the rib 26' partially enters into the groove 17' of the transverse sliding bolt 11', so that the coupling is locked a first time in this manner (Figs. 14, 20). The tongue 54 of the slide rods 41 is held in this position by the thinner part $n$ of the rocking plate 40 and in this manner establishes a rigid connection of the coupling head 1' and the chain 6' (Figs. 14, 20). When the two halves are pushed farther together, under the influence of the groove 15' of the sliding bolt and the ribs 26' of the coupling head 1' the sliding bolt is shifted still farther transversely of the direction of the train in such manner that the projections $e, f$ of the lug 8' of the link 7' pass into the recesses $c, d$ of the bolt 11', this bolt simultaneously arriving at the end of its path, so that the coupling is locked a second time in this manner. During this time the bolt 44 passes out of the position shown in Fig. 20 into that according to Fig. 1, and the rocking plate 40 arrives into a plane running parallel to the direction of the train. In this position the tongue 54 arrives out of reach of the rocking plate 40, so that in the moment when the coupling is locked a second time, the rigid connection between the coupling head 1' and the chain 6' is done away with and when the tensile force occurs the same is completely taken up by the chains and the wedge-shaped faces of the sliding bolts and of the coupling head.

Now if the two coupling heads are removed from one another by means of the key L for the purpose of disconnecting the coupling, during the movement of the sliding bolt 11' caused thereby the bolt 43 approaches the rocking plate 40. Simultaneously, the parts $e, f$ of the projection or lug 8' of the link 7' leave the recesses $b, c$ of the sliding bolt 11' and rest on the walls of the sliding bolt 11' separating the recesses $a, b, c, d$. As the coupling heads are located at an angle (Fig. 15) relatively to the chain, a further displacement of the rocking plate 40 is not possible, as this plate must bear against the tongue 54 of the sliding rods 41. Complete unlocking can therefore now occur only when the cars are pushed apart in such manner that the coupling heads coincide with the chains in one plane (Fig. 14), so that in this case the swinging plate 40 can arrive under the tongue 54 of the sliding rods 41 and take up the position according to Fig. 19. During this movement the tongue 54 is moved by the thicker part $m$ of the rocking plate 40 by its slanting wall out of the position shown in Fig. 21 into that according to Fig. 19, the sliding rods 41 together with the projections 55 shifting in the slots 42, 42' in the direction of the draw hook in such manner that the two halves of the coupling fall into the original slanting position, when they jam against the projections 49 of the links 46 owing to the projections 55 (Figs. 13, 16). The links 46 are lifted by the projections 55 and consequently the link 51 bears against the hook H and holds the entire half of the coupling in the desired slanting position.

When two cars are to be coupled it now suffices for the two halves of the coupling to approach one another whereby the rocking plate 40 is shifted again out of the angular position shown in Fig. 19 into the position according to Fig. 21, when the thicker portion $m$ of the plate 40 moves with its slanting wall out of reach of the tongue 54, so that the sliding rods 41 are now in a position to shift under their own weight in the direction of the coupling heads, the stops 55 being released by the projections 49 of the links 46.

As will be understood from the above, in the embodiment last described the intermediate rod in the former embodiment is entirely superfluous, it being substituted by the rocking plate 40 and the sliding rods 41, these rods simultaneously replacing the above described rods 2, 3 connected with the coupling heads 1. Simultaneously, however, as mentioned above, it is possible to lock the coupling twice. When the intermediate rod is employed, the coupling can be locked only once, because immediately after the mutual engagements of the halves of the coupling the intermediate rod falls down and the coupling head is no longer rigidly connected with the chain. In the latter embodiment, on the contrary, it is possible to lock the coupling twice, because owing to the special form of the rocking plate 40, the rigid connection can be maintained until the coupling is locked a second time, which operation is effected after the collision of the buffers of the cars.

In the embodiment according to Figs. 13 to 24, however, an improved rigid connection between the coupling heads and the chains is also obtained, as, on the one hand, the moving parts are not exposed to such great wear, and, on the other hand, the force met with during the stiffening acts perfectly centrically in consequence of the employment of sliding rods, while in the embodiment according to Figs. 1 to 12 the force acts below the axis of the tensile force.

Owing to the coupling being locked twice the automatic coupling acquires the property which is possessed by the known, non-automatic coupling members provided on every car, and consists in its being possible to fasten the chain present in ordinary couplings by a screw. This is obtained in the present case in similar manner by the coupling being locked twice, the one locking operation taking place before the collision of the buffers, and the second at the moment of the collision or at a predetermined time after the actual collision.

In order to remove the coupling described in Figs. 13 to 24 from the hook of the car it suffices to shift the connecting member 52 (Figs. 22, 24) together with the transverse sliding bolt 11' into the position shown in Figs. 15 and 21, whereby the rocking plate 40 releases the tongue 54 and the projections 55 in such manner that the half of the coupling falls into a vertical position, whereupon it can be removed from the jaw of the hook, so that it readily depends from the pin 37' as shown in Fig. 18.

I claim:—

1. In an automatic coupling device for railway cars, the combination of two coupling halves, each coupling half having a coupling head, a draw hook, a connection between the coupling head and the draw hook, a member adapted to slide in said head perpendicularly to the longitudinal axis of the coupling device, means for producing the sliding movement of the member by the engagement of the two heads one into the other, a link chain loosely attached to the draw hook, the inner link of the link chain passing centrally through the head and through said member, the inner link having a projection centrally locking the member, and means provided in each member for releasing automatically the said connection between the head and the draw hook.

2. In an automatic coupling device for railway cars, the combination of draw hooks, two coupling halves normally supported by the draw hooks in a downwardly inclined position, each coupling half having a coupling head, a connection between the coupling head and the draw hook, each head having a curved horn and a guide, the guide of one head coacting with the horn of the other head, a link chain loosely attached to the draw hook, the inner link of the link chain passing centrally through the head, a member adapted to slide in the head perpendicularly to the longitudinal axis of the coupling device and through which the inner link of said chain passes, means for producing the sliding movement of the member by the engagement of the two heads one into the other, the inner link having a projection centrally locking the member, and means provided in each member for releasing automatically the said connection between the head and the draw hook.

3. In an automatic coupling device for railway cars, the combination of draw hooks, two coupling halves normally supported by the draw hooks in a downwardly inclined position, each coupling half having a coupling head, a connection between the coupling head and the draw head, each head having a curved horn and a guide and a central opening, the guide of one head coacting with the horn of the other head, a link chain loosely attached to the draw hook, the inner link of the link chain forming a bolt passing centrally through the central opening of the head, a member having a recess and adapted to slide in the head arranged perpendicularly to the longitudinal axis of the device and through which the chain passes, each member being provided with a slot and with a slanting groove adapted to engage a slanting rib of the other head, the rib being provided on a lug adapted to take into a neck of the other head, the inner link having a projection adapted to engage said member and centrally locking this member, and means provided in each member for releasing automatically the said connection between the head and the draw hook.

4. In an automatic coupling device for railway cars, the combination of draw hooks, two coupling halves normally supported by the draw hooks in a downwardly inclined position, each coupling half having a coupling head with a curved horn and a guide, the guide of one head coacting with the horn of the other head, rods supporting said head against the draw hook and adapted to be automatically connected with the coupling head, a link chain loosely attached to the draw hook, the inner link of the link chain passing centrally through the head, a member adapted to slide in the head perpendicularly to the longitudinal axis of the coupling device, and through which said chain passes, means for producing the sliding movement of the member by the engagement of the two heads one into the other, the inner link having a projection centrally locking the member, and means provided in each member and each head for automatically releasing the connection by the rods between the head and the draw hook.

5. In an automatic coupling device for railway cars, the combination of draw hooks, two coupling halves normally supported by the draw hooks in a downwardly inclined position, each coupling half having a coupling head with a curved horn and a guide, rods having slots and adapted to support the head against the draw hook, a common tongue, a link chain loosely attached to the draw hook, the inner link of the chain passing centrally through the head, a member adapted to slide perpendicularly to the axis of the coupling device and on the head, and through which member the said link passes, means for producing a sliding movement of the member by the engagement of the two heads one into the other, the inner link having a projection centrally locking the member, a rocking plate pivotally mounted on the coupling head and engaging the tongue, and pins attached to the member coacting with the rocking plate.

6. In an automatic coupling device for railway cars, the combination of draw hooks, two coupling halves normally supported by the draw hooks in a downwardly inclined position, each coupling half having a coupling head formed with a central opening, and with a curved horn, and a guide to coact with similar parts of the other head, rods having slots and adapted to support the head against the draw hook, a common tongue, a link chain loosely attached to the draw hook, the inner link of the chain forming a bolt passing centrally through the central opening of the head, a member adapted to slide in the head and through which the said link passes, said member being arranged perpendicularly to the longitudinal axis of the device, each member being provided with a slot and with a slanting groove, the other head having a slanting rib to engage said groove, a lug formed with said rib and adapted to take into a neck of the other head, the inner link having a projection adapted to engage the member and centrally locking this member, a rocking plate pivotally mounted on the coupling head and engaging the tongue, and pins attached to the member coacting with the rocking plate.

7. In an automatic coupling device for railway cars, the combination of draw hooks, two coupling halves normally supported by the draw hooks in a downwardly inclined position, each coupling half having a coupling head provided with a curved horn and a guide, rods having slots and supporting the head against the draw hook, a common tongue, a link chain loosely attached to the draw hook, the inner link of the link chain passing centrally through the head, a member adapted to slide perpendicularly to the longitudinal axis of the device and in the head, and through which member said link passes, means for producing a sliding movement of the member by the engagement of the two heads one into the other, a rocking plate pivotally mounted on the coupling head and provided with a small outer portion and a thick inner portion, a projection on the inner link to lock said member, the small and thick portions aforesaid engaging the tongue, and pins attached to the member coacting with the rocking plate.

8. In an automatic coupling device for railway cars, the combination of draw hooks, two coupling halves, each coupling half having a coupling head with a curved horn and a guide, a link chain loosely attached to the draw hook, a sliding member mounted to move on the head perpendicularly to the longitudinal axis of the coupling device, the inner link of the link chain passing centrally through the head and through said sliding member adapted to slide therein, means for producing the sliding movement of the member by the engagement of the two heads one into the other, the inner link having a projection centrally locking the member, two rods having slots and projections, a common tongue and provided at the bolts of the link chain, an auxiliary two-link chain on the draw hook, one link of the same being pivotally connected with the bolts of the link-chain, the other link being pivotally mounted in the ordinary hook hole, a bow pivotally connected with the other link of the auxiliary chain and surrounding the under side of the draw hook, the said other link being provided with projections coacting with projections of the two rods, a rocking plate pivotally mounted on the coupling head and engaging the tongue, and pins attached to the member coacting with the rocking plate.

In testimony, that I claim the foregoing as my invention, I have signed my name in presence of two subscribing witnesses.

WITOLD v. SOKOLOWSKI.

Witnesses:
 FR. TREMBISKI,
 THOMAS MILFS.

Copies of this patent may be obtained for five cents each, by addressing the "Commissioner of Patents, Washington, D. C."